United States Patent [19]

Orkin et al.

[11] 3,996,143

[45] * Dec. 7, 1976

[54] CURED ACRYLATE BEARING MEMBER

[75] Inventors: Stanley S. Orkin, Rockville; Edward J. Nagy, Windsor, both of Conn.

[73] Assignee: Kamatics Corporation, Bloomfield, Conn.

[ * ] Notice: The portion of the term of this patent subsequent to Apr. 23, 1991, has been disclaimed.

[22] Filed: Oct. 3, 1975

[21] Appl. No.: 619,476

Related U.S. Application Data

[63] Continuation-in-part of Ser. No. 452,359, March 18, 1974, Pat. No. 3,929,396, which is a continuation-in-part of Ser. No. 241,007, April 4, 1972, Pat. No. 3,806,216.

[52] U.S. Cl. .................. 252/12.4; 252/12; 308/72; 308/238; 308/241

[51] Int. Cl.² ............ C10M 5/00, C10M 7/00; F16C 27/00; F16C 1/24

[58] Field of Search .................. 252/12, 12.2, 252/12.4, 12.6; 308/72, 238, 241

[56] References Cited

UNITED STATES PATENTS

| | | | |
|---|---|---|---|
| 3,806,216 | 4/1974 | Orkin et al. | 308/241 |
| 3,929,396 | 12/1975 | Orkin et al. | 252/12 |

*Primary Examiner*—Delbert E. Gantz
*Assistant Examiner*—I. Vaughn
*Attorney, Agent, or Firm*—Cushman, Darby & Cushman

[57] ABSTRACT

A bearing member comprises a bearing surface consisting essentially of a cured mixture of an acrylate composition, a particulate solid lubricant and organic or inorganic fillers.

7 Claims, No Drawings

CURED ACRYLATE BEARING MEMBER

This application is a continuation-in-part of our application Ser. No. 452,359, filed Mar. 18, 1974, now U.S. Pat. No. 3,929,396 which is a continuation-in-part of our application Ser. No. 241,007, filed Apr. 4, 1972, now U.S. Pat. No. 3,806,216.

The present invention relates to a self-lubricating bearing member, and more particularly, to a self-lubricating bearing member comprising a bearing surface consisting essentially of a cured mixture of an acrylate composition, a particulate solid lubricant and a particulate organic or inorganic filler. The present invention also relates to a bearing member having a bearing surface as defined above on a substrate made of glass, non-ferrous metals such as aluminum, titanium, cobalt or nickel base alloys or the like, or stainless steels and iron base alloys, or a plastic such as a phenolic resin or the like. The present invention is also directed to a bearing assembly comprising two coengaging members movable relative to one another, the first of said members having a bearing surface selected from the group consisting of metal and ceramic and the bearing surface of said other member comprising a cured mixture of an acrylate composition, a particulate solid lubricant and a particulate filler, such as soybean, walnut, pecan, glass fibers, wood, talc, silica, and the like.

The bearing surface as defined above can be applied to the substrate in accordance with such conventional techniques as spraying, brushing or dipping. It has advantageously been found that when the curable composition constituting the bearing surface is so applied the composition adheres to the substrate without any appreciable sagging and can be built up to any desired thickness, preferably to a thickness ranging between 0.0005–0.060 inch. Further, the said curable bearing surface composition conforms easily and readily to the shape of the substrate being coated therewith and consequently can be applied to any desired substrate regardless of its physical configuration such as bushings, rails, tracks, gear teeth and the like, thus providing a significant advantage over materials previously employed such as fabrics having self-lubricating characteristics, as use of the latter generally requires cutting and fitting to the desired shape with subsequent adherence thereto, these operations being both time consuming and expensive. Further, such fabrics as polytetrafluoroethylene fabrics often experienced considerable fraying and were clearly difficult to use in the production of small bearing surfaces.

The bearing surface of the present invention is produced from a curable bearing composition comprising a mixture of a curable acrylic composition, a solid particulate lubricant, organic or inorganic, particulate filler and a carrier or solvent which is essentially completely vaporized during application of the mixture to the desired substrate.

Generally, the curable acrylic composition is present in amounts of about 30–70, preferably about 40 percent by weight of said mixture. The particulate solid lubricant is present in amounts of about 8–30, preferably about 15 percent by weight of said mixture; the particulate filler is present in amounts of about 0–18, preferably about 1–18 percent and more preferably about 11 percent by weight of said mixture; and the vaporizable carrier or solvent is present in amounts of about 15–50, preferably about 40 percent by weight of said mixture.

The curable acrylic composition usefully employed in the present invention is selected from the group consisting of 1. a mixture of an acrylate compound having the formula

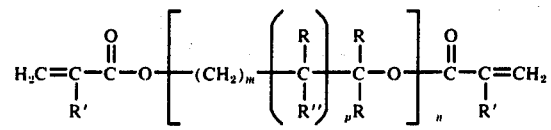

wherein
R is selected from the group consisting of hydrogen, lower alkyl containing 1–4 carbon atoms, hydroxyalkyl containing 1–4 carbon atoms and

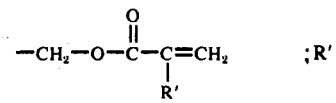

is selected from the group consisting of hydrogen, halogen and lower alkyl having 1–4 carbon atoms, R'' is selected from the group consisting of hydrogen, —OH and

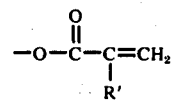

wherein R' has the meaning given above; m is an integer of 1–8; n is an integer of 1–20; and p is 0 or 1, with a catalytic amount of a hydroperoxide catalyst, generally from about 0.1–20% by volume of said compound, characterized (a) by its ability to remain ineffective to polymerize said acrylate in the presence of oxygen at ambient temperature and to initiate polymerization of said monomer in the absence of oxygen at room temperature and (b) its ability to initiate polymerization of said acrylate in the presence of oxygen at a temperature ranging from about 100°–325° F;

2. a mixture of a major amount of a liquid acrylic ester selected from the group consisting of di-, tri- and tetraesters of an acrylic acid and a polyhydric alcohol, a minor amount of a low molecular weight prepolymer of an ester of a low molecular weight alcohol having a terminal vinyl group and an aromatic polycarboxylic acid in solution in said acrylic ester and an organic amide of the formula

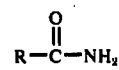

wherein R is selected from the group consisting of hydrogen and aliphatic hydrocarbon of 1–20 carbon atoms in an amount sufficient to copolymerize said acrylic ester and prepolymer;

3. a mixture of acrylic ester monomer, a peroxidic initiator in an amount sufficient to initiate polymerization of said monomer and an aminoalkoxyalkylamine of the formula $R_1$-N(H)$R_2$[O$R_3$]$_x$N(H)$R_4$ wherein $x$ is an integer of 1-6 inclusive, each of $R_1$ and $R_4$ is selected from the group consisting of hydrogen and lower alkyl and each of $R_2$ and $R_3$ is a lower alkyl linking bridge between N and O, in an amount sufficient to accelerate the polymerization of said monomer;

4. a mixture of an acrylic ester of an alkyl amino alkyl alcohol and an effective amount of a hydroperoxide catalyst, said acrylic ester having the formula

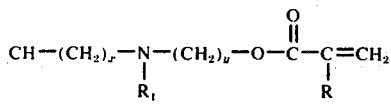

wherein $x$ is an integer of 0-5 inclusive, $y$ is an integer of 1-6 inclusive, R is selected from the group consisting of hydrogen, halogen, hydroxy, cyano and lower alkyl and $R_1$ is selected from the group consisting of hydrogen and alkyl having 1-6 carbon atoms;

5. a mixture of a liquid acrylic ester monomer selected from the group consisting of diesters of an acrylic acid and a polyhydric alcohol, acrylic esters of cyclic ether alcohols, acrylic esters of amino alcohols and mixtures thereof, a peroxidic initiator and an oxyalkylamine of the formula $(H)_mN[(CH_2)_x(OR_1)_yOR_2]_n$ wherein $m$ and $n$ are each integers of 1 to 2 inclusive, the total of $m$ and $n$ is 3, $x$ is an integer of 1 to 6 inclusive, $y$ is an integer of 0 to 6 inclusive, $R_1$ and $R_2$ are lower alkyl;

6. a mixture of an acrylic ester monomer selected from the group consisting of di-, tri- and tetraesters of an acrylic acid and a polyhydric alcohol, acrylic esters of cyclic ether alcohols, acrylic esters of amino alcohols and mixtures thereof, a peroxidic initiator in an amount sufficient to initiate polymerization of said monomer and a member selected from the group consisting of rhodanine and a hydrazide of the formula

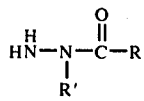

wherein R and R' are selected from separate groups and an interconnected group forming a cyclic ring, R is further selected from the group consisting of hydrogen, alkyl, cycloalkyl, aryl and alkoxy and R' is selected from the group consisting of hydrogen, alkyl, cycloalkyl, acyl and dithiocarbonyl in an amount sufficient to accelerate the polymerization of said monomer;

(7) a mixture of a monomer of the formula

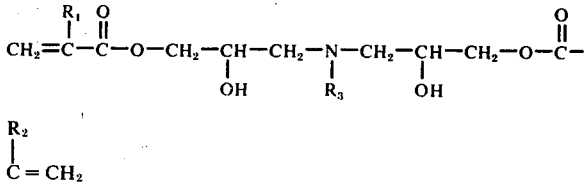

wherein $R_1$ and $R_2$ are selected from the group consisting of hydrogen and lower alkyl and $R_3$ is selected from the group consisting of lower alkyl, lower hydroxyalkyl, cyano and lower cyanoalkyl; at least one equivalent of an acid for each equivalent of said monomer, said acid being selected from the group consisting of acrylic acid and lower alkyl acrylic acids; an initiator selected from the group consisting of t-butyl perbenzoate, t-butyl peracetate and di-t-butyl diperphthalate, said initiator being present in an amount sufficient to initiate the polymerization of said monomer; a trihydroxy benzene inhibitor and an accelerator selected from the group consisting of benzhydrazide and N-aminorhodanine; and (8). a mixture of an acrylate monomer of the formula

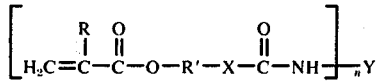

wherein R is selected from the group consisting of hydrogen, halogen and lower alkyl, R' is selected from the group consisting of lower alkylene and arylene, Y is a polyvalent organic radical selected from the group consisting of alkyl, alkenyl, cycloalkyl, aryl, aralkyl, alkaryl and heterocyclic radicals, $n$ is 2-6 inclusive, and a hydroperoxy initiator, present in an amount sufficient to initiate the polymerization of said acrylate monomer.

In the embodiment of the present invention where the acrylate composition defined as (1) above is employed, representative acrylates employed include diethylene glycol dimethacrylate, triethylene glycol dimethacrylate, tetraethylene glycol dimethacrylate, dipropylene glycol dimethacrylate, polyethylene glycol dimethacrylate, di-(pentamethylene glycol) dimethacrylate, tetraethylene glycol diacrylate, tetraethylene glycol di(chloroacrylate), diglycerol diacrylate, diglycerol tetramethacrylate, tetramethylene dimethacrylate, ethylene dimethacrylate, neopentyl glycol diacrylate and trimethylol propane triacrylate.

Suitable hydroperoxide catalysts usefully employed in acrylate composition (1) above include hydrogen peroxide as well as nonpolymerizing organic hydroperoxides which are characterized by the fact that the atoms directly linked to the carbon atom bearing the hydroperoxide radical are selected from the group consisting of carbon, hydrogen, nitrogen or oxygen, and in such cases where all of the said directly linked atoms are carbon, not more than two of said carbon atoms comprise the carbon atom of a methyl group. Representative organic hydroperoxides include a hydroperoxide of a hydrocarbon, an ether or of a ketone and specific catalysts include dimethyl benzyl hydroperoxide (cumene hydroperoxide), methyl ethyl ketone hydroperoxide, and hydroperoxides formed by oxygenation in the liquid phase of the following compounds: methyl butene, cetane, cyclohexane, ethyl ether, ethylene glycol diethyl ether, diethylene glycol dimethyl ether, tetraethylene glycol dimethyl ether, diethylene glycol, propylene glycol, ortho formate, trimethyl ortho formate, acetal, tetraethoxy propane, dioxane, paraldehyde, acetyl acetone, methyl n-hexyl ketone, methyl n-amyl ketone, isopropyl ketone, tetralin and tetra hydrocarbazol.

If desired, an accelerator can also be utilized in the acrylate composition (1) defined above and can be present in amounts of a fraction of a percent up to 10% or more based on the volume of said acrylate compound. Generally, this amount can range between about 0.05-5.0 percent by weight of the composition, preferably about 0.5-2.5 percent by weight. By way of example, representative accelerators include organic amines such as secondary or tertiary amines, organic phosphites, organic mercaptans, ascorbic acid, quaternary ammonium salts and the like. Additionally, as an accelerator, there can be employed an organic imide or formamide such as benzoic sulfimide, succinimide, pathalimide, formamide, N-substituted formamides such as N-ethyl formamide and the metallic salts of the imides such as sodium saccharin.

Additionally, if desired, the acrylate composition (1) defined above can also include a quinone in minor amounts, i.e. as little as 10 ppm and as great as 1000 ppm. Especially useful quinones include benzoquinones and naphthoquinones. Specifically, 1,4-benzoquinone, 2,5-dihydroxy benzoquinone, 2,5-diphenyl-p-benzoquinone, 1,2-naphthoquinone and 9,10-anthraquinone can be utilized. When a quinone or a monohydric or dihydric phenol having at least one alkyl group ortho to each hydroxy group thereof is employed in the acrylate composition (1) defined above, it is also convenient to include a tertiary N,N-dialkyl aryl amine having the formula

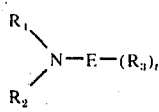

wherein E represents a carbocyclic aromatic nucleus selected from the group consisting of phenyl and naphthyl; $R_1$ and $R_2$ are lower alkyl having 1-4 carbon atoms; $t$ is one of the following: 0 or an integer of 1-5; and $R_3$ is selected from the group consisting of alkyl having 1-4 carbon atoms and lower alkoxy having 1-4 carbon atoms provided that when $R_3$ is in the ortho position, t is greater than 1. There can also be used a heterocyclic secondary amine such as pyrrolidine, piperazine and 1,2,3,4-tetrahydroquinoline. Generally the amine will be present in amounts of about 0.01-3.0 percent by weight of said acrylate compound.

Usually, the unpolymerized acrylate employed in the acrylate composition (1), above, as a viscosity of 100-2500 cps, preferably about 480-720 cps at 25° C, a flash point of not less than 200° F when tested as specified in ASTM D-1310. Further, the unpolymerized acrylate is soluble in trichloroethylene or a solution of trichloroethylene containing 5 percent by volume of acetone when tested as follows: one cubic centimeter of the acrylate compound is placed in 10 cc of trichloroethylene or in 10 cc of said solution; after shaking the mix thoroughly, the solution is examined under transmitted light and is clear and free from precipitate. The polymerized acrylate composition (1), as defined above, has a static shear strength after room temperature curing of 2,000 psi (minimum), generally about 2,000-4,000; a static shear strength after exposure to a temperature of 300° ± 3.6° F for a period of 120 ± 2 minutes of 1000 psi (minimum) and a low temperature static shear strength at −65° ± 2° F of 2,000 psi (minimum).

In the embodiment of the present invention where the acrylate composition defined as (2) above is employed, representative liquid acrylic esters include, for instance, ethylene glycol dimethacrylate, diethylene glycol dimethacrylate, triethylene glycol dimethacrylate, tetraethylene glycol dimethacrylate, polyethylene glycol dimethacrylate, dipropylene glycol dimethacrylate, tetraethylene glycol diacrylate, tetraethylene glycol dichloroacrylate, glycerol trimethacrylate and pentaerythritol tetramethacrylate. Preferably, the esters are those of an acrylic acid and a polyhydric alcohol wherein the acrylic acid has the formula $CH_2 = C(R)—COOH$ wherein R is selected from the group consisting of hydrogen, lower alkyl, such as methyl, and halogen, such as chlorine, and the polyhydric alcohol has the formula $R(OH)_x$ wherein $x$ is 2-4 and R is alkyl or alkoxy. Representative polyols include the di, tri- and tetramethylol hydrocarbons and the ethylene oxide, propylene oxide, butylene oxide and other higher alkylene oxide condensation products such as the ethylene oxide condensation products of the formula $HO — CH_2CH_2(OCH_2CH_2)_mOH$ where $m$ is 0-10. Such esters include, for instance, the polyesters of acrylic, methacrylic or chloracrylic acids and glycerol, trimethylolpropane, trimethylol methane and pentaerythritol.

Useful prepolymers, employed in acrylate composition (2) defined above, include the partial polymerization products of an ester of an ethylenically unsaturated low molecular weight alcohol having a terminal vinyl group, such as allyl alcohol, 4-hydroxy-butene-1, 2-methyl-1-hydroxy-propene-1, and hydroxyoctene-1, and an aromatic polycarboxylic acid such as phthalic, isophthalic, terephthalic, mellitic and naphthalene dicarboxylic acids. The prepolymers include, for instance, those of diallylphthalate, diallyl isophthalate, triallyl trimellitate and diallyltrimellitate. Preferably, the prepolymer has the formula

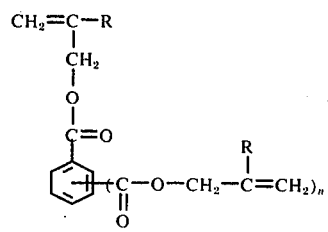

wherein R is hydrogen or methyl and $n$ is 1-2. The prepolymer can be present in amounts of about 5-60 weight percent, preferably about 15-30 weight percent of the acrylate composition. Amounts of about 5-20 weight percent can also be employed.

Representative organic amides employed as a catalyst in acrylate composition (2) above, include formamide, acetamide, propionamide, amides derived from naturally occurring $C_{12}-C_{20}$ fatty acids such as palmitic, stearic, oleic and tallow fatty acids, cyclohexyl carboxylic acid and alkyl substituted cyclohexyl carboxyl acid amides, and cyclohexyl hexanoic acid amide. The amide can be present in amounts of 0.1–10% of the acrylate composition.

In the embodiment of the present invention where the acrylate composition defined as (3) above is employed, the acrylic ester monomer can be, for instance, an acrylic diester of ethylene glycol, an acrylic ester of a cyclic ester alcohol, an acrylic ester of an amino alcohol and mixtures thereof or mixtures of the above with other vinylic monomers such as allylic monomers. Representative acrylic ester monomers include isobutyl methacrylate, n-butyl methacrylate, mixed mono- and di-methacrylates of 2,2,4-trimethylpentanediol, tetrahydrofurfurylmethacrylate, polyethylene glycol dimethacrylate, cyclohexyl methacrylate and dimethylaminoethyl methacrylate.

The peroxidic catalyst, employed usually in amounts of about 0.1 – 10 or 15 percent by weight of acrylate composition (3) includes, for instance, cumene hydroperoxide, t-butyl hydroperoxide, methylethylketone hydroperoxide or peroxide, tetralin hydroperoxide, benzoyl peroxide, lauroyl peroxide and ditertiary butyl diperphthalate.

Useful aminoalkoxyalkylamines employed in acrylate composition (3) include, for instance, N,N'-dimethyl triethylene glycol diamine, N,N'-diethyl diethylene glycol diamine, N,N'-diethyl hexaethylene glycol diamine, di-6-(methylamino) hexyl ether of 1,6-hexanediol, di-6-(hexyl-amino) octyl ether of ethylene glycol, methylaminomethyloxyhexylaminohexane aminopropoxyethyl amine, aminomethoxypropyl amine, methylaminomethoxypropyl amine, aminomethoxymethyl amine, hexylaminohexyloxyhexyl amine, 2-aminoethoxy-3,4-dimethyl hexyl amine, methylaminobutoxybutoxy amine, aminoethoxyethoxyhexyl amine and aminobutoxyhexyloxyhexyloxy butyl amine. The aminoalkyloxyalkylamine accelerator can be present in amounts of about 0.01–10 percent by weight of acrylate composition (3).

In the embodiment of the present invention where the acrylate composition defined as (4) above is employed, the acrylic ester includes, for instance, butylaminoethyl methacrylate, dimethyl aminoethyl cyanoacrylate or methacrylate or chloracrylate, dihexyl aminomethylacrylate, amylaminoethyl ethacrylate, di(t-butyl) aminoethyl methacrylate, di(t-butyl) aminohexyl methacrylate, hexylaminohexyl pentacrylate, methylaminomethyl methacrylate, as well as other esters of acrylic acids and alkylaminoalkanols.

Representative hydroperoxide catalysts usefully employed in acrylate composition (4) include cumene hydroperoxide, t-butyl hydroperoxide, methylethylketone hydroperoxide, tetralin hydroperoxide and 2,5-dimethylhexyl-2,5-dihydroperoxide. The catalyst is present generally in amounts of about 0.1 – 15 percent by weight of said acrylate composition (4).

In the embodiment of the present invention where the acrylate composition defined as (5) above is employed, the liquid acrylic ester monomer can be that employed, for instance, in acrylate compositions (2), (3) and (4).

Representative oxyalkylamines employed in acrylate composition (5) include, for instance, diglycol amine, di(triethylene glycol) amine and other di-(polyethylene glycol) amines including di-(hexaethylene glycol) amine, methoxypropyl amine, hydroxypropyl amine, methoxymethyl amine, hexyloxyhexyl amine, 2-ethoxy-3,4-dimethylhexyl amine, ethoxy-ethoxyethoxyethoxyethoxyethyl amine, butoxybutoxy amine, ethoxyethoxyhexyl amine, hydroxyhexyloxyhexyloxy butyl amine, di-(hydroxybutoxybutoxybutyl) amine and di-(methoxypropyl) amine. The oxyalkylamine accelerator can be present in amounts of about 0.1 – 10 percent or more by weight of acrylate composition (5).

Examples of suitable peroxidic initiators employed in acrylate composition (5) include cumene hydroperoxide, t-butyl hydroperoxide, methylethylketone hydroperoxide or peroxide, tetralin hydroperoxide, benzoyl peroxide, lauroyl peroxide and ditertiary butyl diperphthalate. The initiator is present generally in amounts of 0.1 – 10 or 15 percent by weight of acrylate composition (5).

In the embodiment of the present ievention where the acrylate composition defined as (6) above is employed, the acrylic ester monomer can also be that employed, for instance, in acrylate compositions (2), (3) and (4).

Useful accelerators employed in acrylate composition (6) include rhodanine and organic hydrazides having the formula

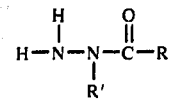

wherein R is selected from the group consisting of hydrogen, alkyl, cycloalkyl, aryl and alkoxy and R' is selected from the group consisting of hydrogen, alkyl, cycloalkyl, acyl and dithiocarbonyl. The groups R and R' can be connected to each other directly or indirectly through other atoms or groups to form a ring system, as in N-aminorhodanine

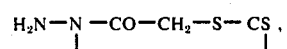

N-aminourazole

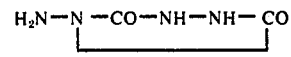

and N-aminophthalimide

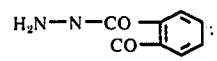

Thus R and R' can constitute the ring structure of a cyclic amide such as the ring structure of rhodanine, glyoxalylurea, mesoxalylurea, alloxanic acid, pyrazolone and phenazone. As further examples, R and R' can be separately selected from hydrogen and $C_1$ to $C_{20}$ or higher aliphatic alkyl or cycloalkyl groups, including the unsaturated aliphatic forms such as alkenyl, alkdienyl, alkenylcycloalkyl, and the like, e.g. methyl, heptenyl, hexadecenyl, dodecadienyl, eicosyl, cyclohexyl, ethylcyclohexyl and propenylcyclohexyl. As still other examples, R can be aryl or alkoxy such as benzyl, anthracyl, benzylethyl, ethoxy, cyclohexoxy, heptadecoxy, methoxypropyl, ethoxyethoxyethoxy and ethoxyethoxyethoxybutyl; also R' can be the acyl or dithiocarbonyl, including formyl, propionyl, acrylyl and oleyl. Representative accelerators include ethyl carbazate, t-butyl carbazate, rhodanine and N-amino rhodanine. The accelerator can be present in amounts of about 0.001 to 10 or more weight percent of acrylate composition (6).

Representative peroxidic initiators employed in acrylate composition (6) include cumene hydroperoxide, t-butyl hydroperoxide, methylethylketone hydroperoxide, tetralin hydroperoxide, di-t-butyl peroxide, t-butyl peracetate and di-t-butyl diperphthalate. The initiator is generally present in amounts of about 0.05 to 10 or 20 percent or more by weight of acrylate composition (6).

In the embodiment of the present invention where the acrylate composition defined as (7) above is employed, the monomer can be prepared by the reaction of one mole for instance of isopropyl amine, n-butyl amine or cyanamide with two moles of glycidyl methacrylate. Generally, the monomer will be present in amounts of about 5 - 80 percent by weight of said acrylate composition (7).

Representative vinyl organic acids employed in acrylate composition (7) include acrylic and the lower alkyl acrylic acids, preferably methacrylic acid.

The initiator employed in acrylate composition (7) is t-butyl peracetate, di-t-butyl diperphthalate or t-butyl perbenzoate, present in amounts of about 1-3 percent by weight of said acrylate composition (7).

The trihydroxy benzene inhibitor, preferably pyrogallol is present in amounts of about 0.1 - 1.0 and preferably about 0.2 - 0.5 percent by weight of said acrylate composition (7).

The accelerator, benzhydrazide or N-amino rhodanine, is present in amounts of about 0.05 to 0.2 and preferably about 0.10 to 0.15 percent by weight of said acrylate composition (7).

In the embodiment of the present invention where the acrylate composition defined as (8) above is employed, the acrylate monomer can be provided by reacting at a temperature between about 10° C and about 175° C, an organic polyisocyanate and an acrylate ester containing a hydroxy or amino group in the non-acrylate portion thereof, the amount of ester employed being sufficient to react with substantially all of the isocyanate groups of the polyisocyanate.

Acrylate esters suitably employed have the formula

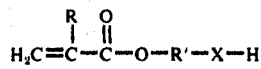

wherein X is —O— or

wherein R'' is hydrogen or lower alkyl containing 1-7 carbon atoms, R is selected from hydrogen, halogen, especially chlorine, and lower alkyl, particularly methyl and ethyl, R' is a divalent organic radical selected from lower alkylene having 1-8 carbon atoms and arylene, particularly phenylene and naphthylene.

Representative specific acrylate esters include hydroxy ethyl acrylate, hydroxy ethyl methacrylate, amino ethyl methacrylate, 3-hydroxy propyl methacrylate, amino propyl methacrylate, hydroxy hexyl acrylate, t-butyl aminoethyl methacrylate and hydroxy octyl methacrylate.

Representative polyisocyanates include toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, trimethylene diisocyanate, tetramethylene diisocyanate, hexamethylene diisocyanate, ethylene diisocyanate, cyclohexylene diisocyanate, nonamethylene diisocyanate, octadecamethylene diisocyanate, 2-chloropropane diisocyanate, 2,2'-diethylether diisocyanate, 3-(dimethylamine) pentane diisocyanate, tetrachlorophenylene diisocyanate-1,4,3-heptane diisocyanate and transvinylene diisocyanate.

There can also be employed a higher molecular weight polyisocyanates obtained by reacting polyamines containing terminal, primary and secondary amine groups or polyhydric alcohols, for example, the alkane and alkene polyols such as glycerol, 1,5-pentanediol, polyethylene glycol, bisphenol-A, 4,4'-dihydroxy phenyl dimethylmethane substituted bisphenol-A and the like with an excess of any of the abovedescribed polyisocyanates. These higher molecular weight polyisocyanates can be represented by the formula

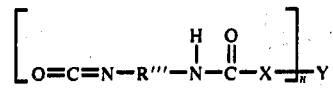

wherein Y is a polyvalent organic radical selected from alkyl, alkenyl, cycloakyl, aryl, aralkyl, alkaryl and heterocyclic radicals, n is 2-6, R''' is an organic radical selected from the group consisting of alkyl, alkenyl, cycloalkyl, aryl, aralkyl and alkaryl radicals of 2 to 20 carbon atoms and X has the meaning given above.

Preferred organic polyisocyanates include the higher alkenyl diisocyanates, the cycloalkenyl diisocyanates and the aromatic diisocyanates containing more than 8 carbon atoms and preferably from 15 - 30 carbon atoms.

The initiator employed in the acrylate composition (8) can be conventional peroxy catalysts, particularly the hydroperoxides and organic hydroperoxides including peresters such as t-butyl perbenzoate. The preferred catalysts or initiators are the organic hydroperoxides such as cumene hydroperoxide and t-butyl hydroperoxide. The initiator can be present in an amount of about 0.01 - 10 weight percent, preferably about 1 - 10 weight percent although amounts in excess of 15% by weight may be used.

Various additives such as accelerators or inhibitors can also be employed in the acrylate composition (8). Typical additives include quinone and hydroquinone inhibitors or stabilizers and tertiary amine and imide accelerators. Generally the accelerators are present in an amount less than 10 percent by weight while the inhibitors are usually present in an amount from about 10 - 1,000 ppm.

If desired, the acrylate composition can also include as a stabilizer an ester prepared by reacting acrylic or lower alkyl acrylic acids with lower alkanols. The stabilizer can be present in amounts of about 0 - 60 percent by weight of the total acrylate composition. Moreover, if desired, a viscosity increasing component such as dimeric and trimeric aliphatic organic acids having from 36 to 54 carbon atoms in amounts of 0 - 60 percent by weight of the acrylate composition can be employed.

The particulate solid lubricant employed in the present invention can be, for instance, polytetrafluoroethylene, preferably in flock or powder form, molybdenum disulfide, graphite fibers, flakes or beads, silver powder, lead powder, and the like.

The particulate filler used in combination with the other stated components to provide the bearing surface of the present invention imparts good wear and bearing characteristics to the resulting bearing surface and is well distributed therethrough. Further, the particulate filler is essentially inert with respect to the cured mixture of other components. Importantly, the presence of the particulate filler permits spraying the curable composition on the surface of a substrate without deleterious sagging or displacement of the composition from the as-applied position or area thereon. Preferably the size of particulate filler is such as to be ssufficiently small as to pass through the orifice of conventional spray equipment preferably electrostatic spray means without clogging the same. Generally, the particulate filler has a size ranging from 100 to 200 mesh, U.S. sieve, although other sizes can be employed when, for instance, the curable bearing composition is applied to the substrate by, for instance, spraying, brushing or dipping techniques. Preferably, the particulate filler is powdered pecan flour.

In producing the self-lubricating bearing surface in accordance with the present invention, there is applied to the desired substrate the said curable bearing composition which includes a vaporizable solvent or carrier, such as methylchloride or acetone or the like, and preferably methyl chloride in amounts sufficient to impart to the resulting admixture a viscosity suitable for the method selected for applying the composition to the substrate, i.e. spraying, dipping or brushing.

Preferably, as noted above, the curable bearing composition is applied to the substrate by spraying and it has been found that essentially all the vaporizable carrier or solvent evaporates during this operation thereby leaving on the sprayed surface an essentially solvent-free composition. This is particularly advantageous since it avoids the possibility of adverse after effects resulting from driving off the carrier or solvent during the curing operation, which adverse effects can be reflected in the presence of voids in portions of the cured composition.

If desired, the surface of the substrate to be provided with the bearing composition of this invention can be treated to enhance the bonding of the cured bearing composition thereto, such treatment including vapor blasting, grit blasting, chemical etching and the like.

The curable bearing composition can be cured under anaerobic conditions in an inert atmosphere essentially free from an oxygen-containing gas for a period ranging from about 6 minutes to 24 hours at a temperature ranging from about ambient temperature to 325° F. On the other hand, when it is not desired to cure the bearing composition under anaerobic conditions, it has been found that the same can conveniently be cured in the presence of an oxygen-containing gas at a temperature ranging from about 100°–325° F for a period ranging from about 6 minutes to 2 hours. Generally, the use of lower temperatures requires a somewhat longer cure time.

The cured bearing surface, if desired or necessary, can be subsequently machined, ground, polished or sanded to desired dimensions and tolerances.

In another embodiment of the present invention the curable bearing composition, as previously defined, can be applied to a surface previously treated with a parting or release agent so that subsequent to curing the composition the thus cured bearing composition can be separated from the surface to which it was applied. Representative of such agents are polytetrafluoroethylene, silicone, wax emulsion and the like.

An additional advantage of the curable bearing composition of this invention is that since it adheres well to itself on curing, damaged bearing surfaces made with the composition can easily be repaired or patched or original portions thereof can be selectively removed and replaced.

What is claimed is:

1. A self-lubricating bearing member comprising a bearing surface consisting essentially of a cured mixture of an acrylate composition comprising 30 to 70 percent by weight of said bearing surface, a particulate solid lubricant comprising 8 to 30 percent by weight of said bearing surface and a particulate filler comprising 1–18 percent by weight of said bearing surface, said acrylate composition being selected from the group consisting of 1. a mixture of a compound having the formula

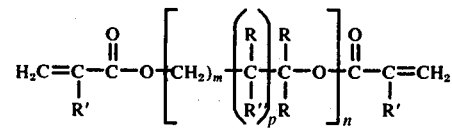

wherein
R is selected from the group consisting of hydrogen, lower alkyl containing 1–4 atoms, hydroxyalkyl containing 1–4 carbon atoms and

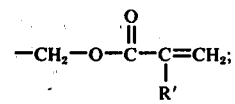

R' is selected from the group consisting of hydrogen, halogen and lower alkyl having 1–4 carbon atoms, R" is selected from the group consisting of hydrogen, -OH and

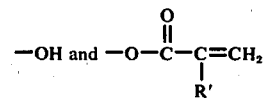

wherein R' has the meaning given above; $m$ is an integer of 1–8; $n$ is an integer of 1–20; and $p$ is 0 or 1, with a catalytic amount of a hydroperoxide catalyst, characterized (a) by its ability to remain ineffective to polymerize said acrylate in the presence of oxygen at ambient temperature and to initiate polymerization of said monomer in the absence of oxygen at room temperature and (b) its ability to initiate polymerization of said acrylate in the presence of oxygen at a temperature ranging from about 100°–325° F;

2. a mixture of a major amount of a liquid acrylic ester selected from the group consisting of di-, tri- and tetraesters of an acrylic acid and a polyhydric alcohol, a minor amount of a low molecular weight prepolymer of an ester of a low molecular weight alcohol having a terminal vinyl group and an aromatic polycarboxylic acid in solution in said acrylic ester and an organic amide of the formula

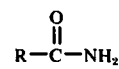

wherein R is selected from the group consisting of hydrogen and aliphatic hydrocarbon of 1–20 carbon atoms in an amount sufficient to copolymerize said acrylic ester and prepolymer;

3. a mixture of acrylic ester monomer, a peroxidic initiator in an amount sufficient to initiate polymerization of said monomer and an aminoalkoxyalkylamine of the formula $R_1-N(H)R_2[OR_3]_xN(H)R_4$ wherein $x$ is an integer of 1–6 inclusive, each of $R_1$ and $R_4$ is selected from the group consisting of hydrogen and lower alkyl and each of $R_2$ and $R_3$ is a lower alkyl linking bridge between N and O, in an amount sufficient to accelerate the polymerization of said monomer;

4. a mixture of an acrylic ester of an alkyl amino alkyl alcohol and an effective amount of a hydroperoxide catalyst, said acrylic ester having the formula

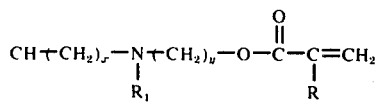

wherein $x$ is an integer of 0–5 inclusive, $y$ is an integer of 1–6 inclusive, R is selected from the group consisting of hydrogen, halogen, hydroxy, cyano and lower alkyl and $R_1$ is selected from the group consisting of hydrogen and alkyl having 1–6 carbon atoms;

5. a mixture of a liquid acrylic ester monomer selected from the group consisting of diesters of an acrylic acid and a polyhydric alcohol, acrylic esters of cyclic ether alcohols, acrylic esters of amino alcohols and mixtures thereof, a peroxidic initiator and an oxyalkylamine of the formula $(H)_mN[(CH_2)_x(OR_1)_yOR_2]_n$ wherein $m$ and $n$ are each integers of 1 to 2 inclusive, the total of $m$ and $n$ is 3, $x$ is an integer of 1 to 6 inclusive, $y$ is an integer of 0 to 6 inclusive, $R_1$ and $R_2$ are lower alkyl;

6. a mixture of an acrylic ester monomer selected from the group consisting of di-, tri- and tetraesters of an acrylic acid and a polyhydric alcohol, acrylic esters of cyclic ether alcohols, acrylic esters of amino alcohols and mixtures thereof, a peroxidic initiator in an amount sufficient to initiate polymerization of said monomer and a member selected from the group consisting of rhodanine and a hydrazide of the formula

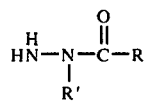

wherein R and R' are selected from separate groups and an interconnected group forming a cyclic ring, R is further selected from the group consisting of hydrogen, alkyl, cycloalkyl, aryl and alkoxy and R' is selected from the group consisting of hydrogen, alkyl, cycloalkyl, acyl and dithiocarbonyl in an amount sufficient to accelerate the polymerization of said monomer;

7. a mixture of a monomer of the formula

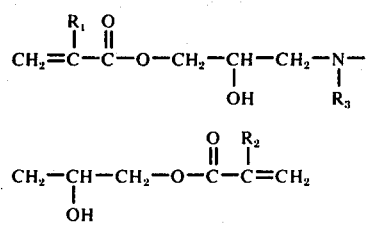

wherein $R_1$ and $R_2$ are selected from the group consisting of hydrogen and lower alkyl and $R_3$ is selected from the group consisting of lower alkyl, lower hydroxyalkyl, cyano and lower cyanoalkyl; at least one equivalent of an acid for each equivalent of said monomer, said acid being selected from the group consisting of acrylic acid and lower alkyl acrylic acids; an initiator selected from the group consisting of t-butyl perbenzoate, t-butyl peracetate and di-t-butyl diperphthalate, said initiator being present in an amount sufficient to initiate the polymerization of said monomer; a trihydroxy benzene inhibitor and an accelerator selected from the group consisting of benzhydrazide and N-aminorhodanine, and 8. a mixture of an acrylate monomer of the formula

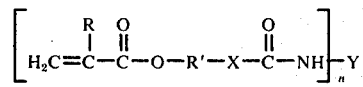

wherein R is selected from the group consisting of hydrogen, halogen and lower alkyl, R' is selected from the group consisting of lower alkylene and arylene, Y is a polyvalent organic radical selected from the group consisting of alkyl, alkenyl, cycloalkyl, aryl, aralkyl, alkaryl and heterocyclic radicals and $n$ is 2–6 inclusive, and a hydroperoxy initiator, present in an amount sufficient to initiate the polymerization of said acrylate monomer.

2. The self-lubricating bearing member of claim 1 wherein said bearing surface comprises a coating on a substrate selected from glass, metal or plastic, said coating having a thickness ranging from 0.0005 to 0.06 inch.

3. The self-lubricating bearing member of claim 1 wherein said particulate solid lubricant is selected from the group consisting of polytetrafluoroethylene, molybdenum disulfide, graphite, silver powder and lead powder.

4. The self-lubricating bearing member of claim 1 wherein said particulate filler is selected from the group consisting of wood, talc, soybean, walnut, pecan, silica and fiberglass fibers.

5. A bearing assembly comprising two coengaging members movable relative to one another, the first of said members having a bearing surface selected from the group consisting of metal and ceramic and the bearing surface of the other member consisting essentially of a cured mixture of an acrylate composition comprising 30 to 70 percent by weight thereof, a particulate solid lubricant comprising 8 to 30 percent by weight thereof and a particulate filler comprising 1–18 percent by weight thereof, said acrylate composition being selected from the group consisting of 1. a mixture of a compound having the formula

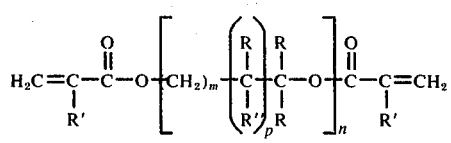

wherein
R is selected from the group consisting of hydrogen, lower alkyl containing 1–4 atoms, hydroxyalkyl containing 1–4 carbon atoms and

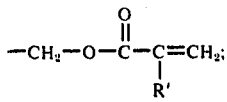

R' is selected from the group consisting of hydrogen, halogen and lower alkyl having 1-4 carbon atoms, R'' is selected from the group consisting of hydrogen, —OH and

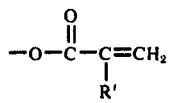

wherein R' has the meaning given above; m is an integer of 1-8; n is an integer of 1-20; and p is 0 or 1, with a catalytic amount of a hydroperoxide catalyst, characterized (a) by its ability to remain ineffective to polymerize said acrylate in the presence of oxygen at ambient temperature and to initiate polymerization of said monomer in the absence of oxygen at room temperature and (b) its ability to initiate polymerization of said acrylate in the presence of oxygen at a temperature ranging from about 100°–325° F;

2. a mixture of a major amount of a liquid acrylic ester selected from the group consisting of di-, tri- and tetraesters of an acrylic acid and a polyhydric alcohol, a minor amount of a low molecular weight prepolymer of an ester of a low molecular weight alcohol having a terminal vinyl group and an aromatic polycarboxylic acid in solution in said acrylic ester and an organic amide of the formula

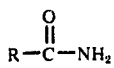

wherein R is selected from the group consisting of hydrogen and aliphatic hydrocarbon of 1–20 carbon atoms in an amount sufficient to copolymerize said acrylic ester and prepolymer;

3. a mixture of acrylic ester monomer, a peroxidic initiator in an amount sufficient to initiate polymerization of said monomer and an aminoalkoxyalkylamine of the formula $R_1\text{-}N(H)R_2[OR_3]_x N(H)R_4$ wherein $x$ is an integer of 1-6 inclusive, each of $R_1$ and $R_4$ is selected from the group consisting of hydrogen and lower alkyl and each of $R_2$ and $R_3$ is a lower alkyl linking bridge between N and O, in an amount sufficient to accelerate the polymerization of said monomer;

4. a mixture of an acrylic ester of an alkyl amino alkyl alcohol and an effective amount of a hydroperoxide catalyst, said acrylic ester having the formula

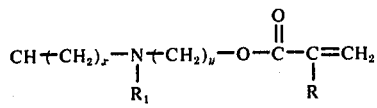

wherein $x$ is an integer of 0–5 inclusive, $y$ is an integer of 1–6 inclusive, R is selected from the group consisting of hydrogen, halogen, hydroxy, cyano and lower alkyl and $R_1$ is selected from the group consisting of hydrogen and alkyl having 1–6 carbon atoms;

5. a mixture of a liquid acrylic ester monomer selected from the group consisting of diesters of an acrylic acid and a polyhydric alcohol, acrylic esters of cyclic etheralcohols, acrylic esters of amino alcohols and mixtures thereof, a peroxidic initiator and an oxyalkylamine of the formula $(H)_m N[(CH_2)_x(OR_1)_y OR_2]_n$ wherein $m$ and $n$ are each integers of 1 to 2 inclusive, the total of $m$ and $n$ is 3, $x$ is an integer of 1 to 6 inclusive, $y$ is an integer of 0 to 6 inclusive, $R_1$ and $R_2$ are lower alkyl;

6. a mixture of an acrylic ester monomer selected from the group consisting of di-, tri- and tetraesters of an acrylic acid and a polyhydric alcohol, acrylic esters of cyclic ether alcohols, acrylic esters of amino alcohols and mixtures thereof, a peroxidic initiator in an amount sufficient to initiate polymerization of said monomer and a member selected from the group consisting of rhodanine and a hydrazide of the formula

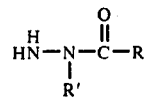

wherein R and R' are selected from separate groups and an interconnected group forming a cyclic ring, R is further selected from the group consisting of hydrogen, alkyl, cycloalkyl, aryl and alkoxy and R' is selected from the group consisting of hydrogen, alkyl, cycloalkyl, acyl and dithiocarbonyl in an amount sufficient to accelerate the polymerization of said monomer; and 7. a mixture of a monomer of the formula

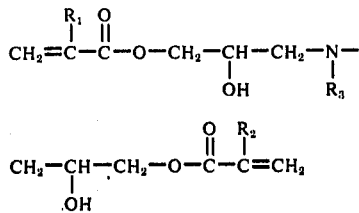

wherein $R_1$ and $R_2$ are selected from the group consisting of hydrogen and lower alkyl and $R_3$ is selected from the group consisting of lower alkyl, lower hydroxyalkyl, cyano and lower cyanoalkyl; at least one equivalent of an acid for each equivalent of said monomer, said acid being selected from the group consisting of acrylic acid and lower alkyl acrylic acids; an initiator selected from the group consisting of t-butyl perbenzoate, t-butyl peracetate and di-t-butyl diperphthalate, said initiator being present in an amount sufficient to initiate the polymerization of said monomer; a trihydroxy benzene inhibitor and an accelerator selected from the group consisting of benzhydrazide and N-aminorhodanine and 8. a mixture of an acrylate monomer of the formula

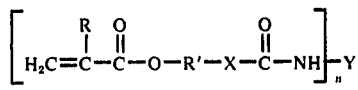

wherein R is selected from the group consisting of hydrogen, halogen and lower alkyl, R' is selected from the group consisting of lower alkylene and arylene, Y is a polyvalent organic radical selected from the group consisting of alkyl, alkenyl, cycloalkyl, aryl, aralkyl, alkaryl and heterocyclic radicals and $n$ is 2–6 inclusive, and a hydroperoxy initiator, present in an amount sufficient to initiate the polymerization of said acrylate monomer.

6. The bearing assembly of claim 5 wherein said particulate solid lubricant is selected from the group consisting of polytetrafluoroethylene, molybdenum disulfide, graphite, silver powder and lead powder.

7. The bearing assembly of claim 5 wherein said particulate filler is selected from the group consisting of soybean, walnut, pecan, fiberglass fibers, wood, talc and silica.

* * * * *